(12) United States Patent
McKeehan et al.

(10) Patent No.: US 6,353,859 B1
(45) Date of Patent: *Mar. 5, 2002

(54) OBJECT-ORIENTED APPARATUS AND METHOD FOR CONTROLLING ACCESSES TO OBJECTS IN A DISTRIBUTED OBJECT ENVIRONMENT

(75) Inventors: Michael D. McKeehan, Rochester, MN (US); Andre Tost, Hannover (DE); Erik E. Voldal, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/846,995

(22) Filed: Apr. 30, 1997

(51) Int. Cl.[7] ................................................. G06F 9/54
(52) U.S. Cl. ...................................................... 709/315
(58) Field of Search ................................. 395/680, 712, 395/726, 727, 728, 683; 709/315

(56) References Cited

U.S. PATENT DOCUMENTS

| | | | | |
|---|---|---|---|---|
| 5,488,723 A | * | 1/1996 | Baradel et al. | 395/700 |
| 5,560,005 A | * | 9/1996 | Hoover et al. | 395/600 |
| 5,644,771 A | * | 7/1997 | Endicott et al. | 395/712 |
| 5,734,902 A | * | 3/1998 | Atkins et al. | 395/683 |
| 5,787,280 A | * | 7/1998 | Joseph et al. | 395/619 |

OTHER PUBLICATIONS

"Life Cycle Services Specification", OMG TC Document 93.7.4, pp. 1–21, Jul. 1993.*
"SOMobjects Developer Toolkit: Users Guide", IBM, chapter 9 pp. 1–24, Jun. 1993.*
Stevenson et al., "Client–Server Interactions in Multi–Server Operating Systems: The Mach–US Approach", School of Computer Science Carnegie Mellon University, pp. 1–15, Sep. 1994.*
Object Management Group, "CORBA Security Draft", OMG Document No. 95–9–1, p. 166, Sep. 1995.*
Julin, "Naming Facilities for Operating System Emulation in Mach 3.0", School of Computer Science, Carnegie Mellon University, pp. 1 and 3.*
Object Management Group, "ORB Interoperability", OMG Document No. 94–3–3, p. 20, Mar. 1994.*
Triantafillou et al., "Multiclass Replicated Data Mangement: Exploiting Replication to Improve Efficiency", IEE Transactions on Parallel and Distributed Systems, vol. 5, No. 2, pp. 121–138, Feb. 1994.*

(List continued on next page.)

Primary Examiner—St. John Courtenay, III
Assistant Examiner—Gary Scott Fourson
(74) Attorney, Agent, or Firm—Martin & Associates, LLC; Derek P. Martin (57) ABSTRACT

An access mechanism and method for accessing objects in a distributed object system manages object accesses and causes all accesses within one transaction to be to either the home object or the local copy, whichever is accessed first. When an object is accessed for the first time in a given transaction, the requested access is granted. For example, if home access is requested to an object in a different process, a proxy is created to access the object in its home location. When the object is subsequently accessed within the same transaction, the access mechanism ensures that the same access is used to assure that changes are not being made to a home object and a local copy or to more than one local copy simultaneously. In an alternative embodiment an exception may be generated if the requested access cannot be provided.

26 Claims, 4 Drawing Sheets

OTHER PUBLICATIONS

Triantafillou et al., "A New Paradigm for High Availability and Efficiency in Replicated Distributed Databases," IEEE, pp. 136–143, Dec. 1990.*

Warner et al., "Version Pool Management in a Multilevel Secure Multiversion Transaction Manager", IEEE, pp. 169–182, May 1995.*

Oh et al., "An Incremental Update Propagation Scheme for a Cooperative Transaction Model," IEEE, pp. 353–362, Sep. 1996.*

Atluri et al., "Alternative Correctness Criteria for Concurrent Execution of Transactions in Multilevel Secure Databases," IEEE, pp. 839–854, Oct. 1996.*

Kang et al., "Supporting Reliable and Atomic Transaction Management in Multidatabase Systems," IEEE, pp. 457–464, May 1993.*

Chundi et al., "Deferred Updates and Data Placement in Distributed Databases," IEEE, pp. 469–476, Mar. 1996.*

* cited by examiner

FIG. 1

| | Process of Requested v. Requesting Object | Requested Object Accessed in This Transaction? | Access Requested | Local Copy Exists in This Process? | Local Copy Exists in a Different Process? | Access Granted | How is Access Granted? |
|---|---|---|---|---|---|---|---|
| 1 | Same | No | Home | No | No | Home | Direct Access |
| 2 | Same | Yes | Home | No | No | Home | Direct Access |
| 3 | Different | No | Home | No | No | Home | Via Proxy |
| 4 | Different | Yes | Home | No | No | Home | Via Proxy |
| 5 | Same | Yes | Home | Yes | No | Local | Access Local Copy |
| 6 | Different | Yes | Home | Yes | No | Local | Override |
| 7 | Same | Yes | Home | No | Yes | Proxy Access to Local Copy | Via Proxy |
| 8 | Different | Yes | Home | No | Yes | Proxy Access to Local Copy | Via Proxy |
| 9 | Same | No | Local | No | No | Local | Pass New Local Object |
| 10 | Same | Yes | Local | No | No | Home | Override |
| 11 | Different | No | Local | No | No | Local | Create Local Copy |
| 12 | Different | Yes | Local | No | No | Home | Via Proxy |
| 13 | Same | Yes | Local | Yes | No | Local | Access Local Copy |
| 14 | Different | Yes | Local | Yes | No | Local | Access Local Copy |
| 15 | Same | Yes | Local | No | Yes | Proxy Access to Local Copy | Via Proxy |
| 16 | Different | Yes | Local | No | Yes | Proxy Access to Local Copy | Via Proxy |

OBJECT-ORIENTED APPARATUS AND METHOD FOR CONTROLLING ACCESSES TO OBJECTS IN A DISTRIBUTED OBJECT ENVIRONMENT

BACKGROUND OF THE INVENTION

1. Technical Field

The present invention relates in general to the data processing field. More specifically, the present invention relates to the field of object-oriented programming techniques and mechanisms in a distributed object environment.

2. Background Art

The development of the EDVAC computer system of 1948 is often cited as the beginning of the computer era. Since that time computers have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks are capable of performing jobs that no single computer could perform and they allow low cost personal computer systems to connect to larger systems to perform tasks that such low cost systems could not perform alone. In order for computer systems to cooperate in a network to perform some complex job, software must be developed which efficiently delegates parts of the chore or tasks to different computers in the network. One of the recent advances in the field of software development has been the emergence of object oriented programming technology.

The goal of using object-oriented programming is to create small, reusable sections of program code known as objects that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a group of well-tested objects, a more stable, uniform, and consistent approach to developing new computer programs can be achieved.

Typically, object-oriented (OO) processes within object-oriented software programs create and use objects to accomplish the required or desired goals of the program. A typical OO software process creates an object or group of objects which are accessible by other objects within that process. Sometimes one object in one process may need to access another object in a different process. OO processes may reside in a number of different locations in a networked computing environment. For example, two processes may reside on the same computer system, or they may reside on different computer systems that are geographically remote from each other and coupled by a communication link. When objects are distributed in different processes and need to intercommunicate with each other, this environment is known as a distributed object environment. A distributed object environment, as used herein, means any hardware and software configuration and/or combination that allows an object in a first process to access an object in a second process. Examples of known distributed object systems include: 1) a first process and a second process residing on the same computer; 2) a first process and a second processes residing on different computer workstations in a local area network (LAN); and 3) a first process and a second process residing on computers in geographically remote locations that are interconnected using a wide area network (WAN). As technology progresses, other distributed object systems will, no doubt, be developed, and the present invention expressly encompasses all types of distributed object systems, whether now known or developed in the future.

When a process creates an object, the process is the "home" location of the object. When a process needs to access an object that it did not create, it must either access the object in its home location, or it must access a copy of the object within its own process. Access to an object in its home location by a different process is accomplished by creating a proxy object within the different process that references the object in its home location. The proxy is instantiated as a member of a class that supports the same interface as the object for which it is a proxy, but the methods on the proxy object simply call the methods on the object that exists in the other process. An access to an object by invoking methods on a proxy object that, in turn, invokes remote method calls to the real object in its home location is known as "home access".

The speed of an access to a remote object may be enhanced by copying the remote object to the local process. An access to a copy of an object by invoking methods on a local copy of the object is known as "local access". However, copying objects gives rise to the issue of data integrity between the different copies of the objects.

Data integrity is a difficult problem in distributed object systems that allow multiple copies of the same object to exist. If the data in one object in its home location is changed and the data in a copy of the same object is changed by a local process, it may be impossible to reconcile the differences between the home object and the local copy. This problem is most often solved by locking certain parts of the object and allocating access to only one copy of an object at a time. This solution requires significant resources and complexity in controlling the data locking, and also creates new problems. For example, any changes to a local copy of an object must be propagated back to the home copy. Another problem is the latency that results from an object waiting to access an object that is locked by another object. In addition, when an object is accessed, any subsequent accesses to that object must access the same object to assure the integrity of the data in the object across the entire transaction. Without a mechanism for allowing more efficient accesses to distributed objects, the computer industry will never fully realize the benefits of object-oriented programs in distributed object environments.

DISCLOSURE OF INVENTION

According to the present invention, an access mechanism and method for accessing objects in a distributed object system manages object accesses and causes all accesses within one transaction to be to either the home object or the local copy, whichever is accessed first. When an object is accessed for the first time in a given transaction, the requested access is granted. For example, if home access is requested to an object in a different process, a proxy is created to access the object in its home location. When the object is subsequently accessed within the same transaction, the access mechanism ensures that the same access is used to assure that changes are not being made to a home object and a local copy or to more than one local copy simultaneously. In an alternative embodiment an exception may be generated if the requested access cannot be provided.

BEST MODE FOR CARRYING OUT THE INVENTION

The present invention relates to object-oriented programming techniques. For those individuals who are not generally familiar with object-oriented programming, the Overview section below presents many of the concepts that will help to understand the invention. Individuals skilled in the art of object-oriented programming technology may wish to skip the Overview section and proceed directly to the Detailed Description section of this specification.

Overview

Obiect-oriented Technology v. Procedural Technology

Object-oriented programming is a method of implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects. Said another way, object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code that provide one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. Thus, in the classic object model, a client object sends request messages to server objects to perform any necessary or desired function. The message identifies a particular server object and specifies what method is to be performed by the server object, and also supplies any required parameters. The server object receives and interprets the message, and can then decide what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system, a "client object" in one location calls methods on a "server object" in another location, which may be a remote location. The client object—server object interactions form the basis for the distributed object system.

Another central concept in object-oriented programming is the class. A class is a template or prototype that defines a type of object. A class outlines the makeup of objects that belong to that class. By defining a class, objects can be created that belong to the class without having to rewrite the entire definition for each new object as it is created. This feature of object-oriented programming promotes the reusability of existing definitions and promotes efficient use of program code.

There are many computer languages that presently support object-oriented programming techniques. For example, Smalltalk, Object Pascal, C++ and Java are all examples of programming languages that support object-oriented programming to one degree or another.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

Detailed Description

According to the present invention, an apparatus and method for managing accesses between objects in a distributed object system assures data integrity by granting the first requested access, and by assuring that the same object is accessed in subsequent accesses in the transaction, thereby maintaining data coherency between an object in its home location and any local copy that may exist.

Figure 1:
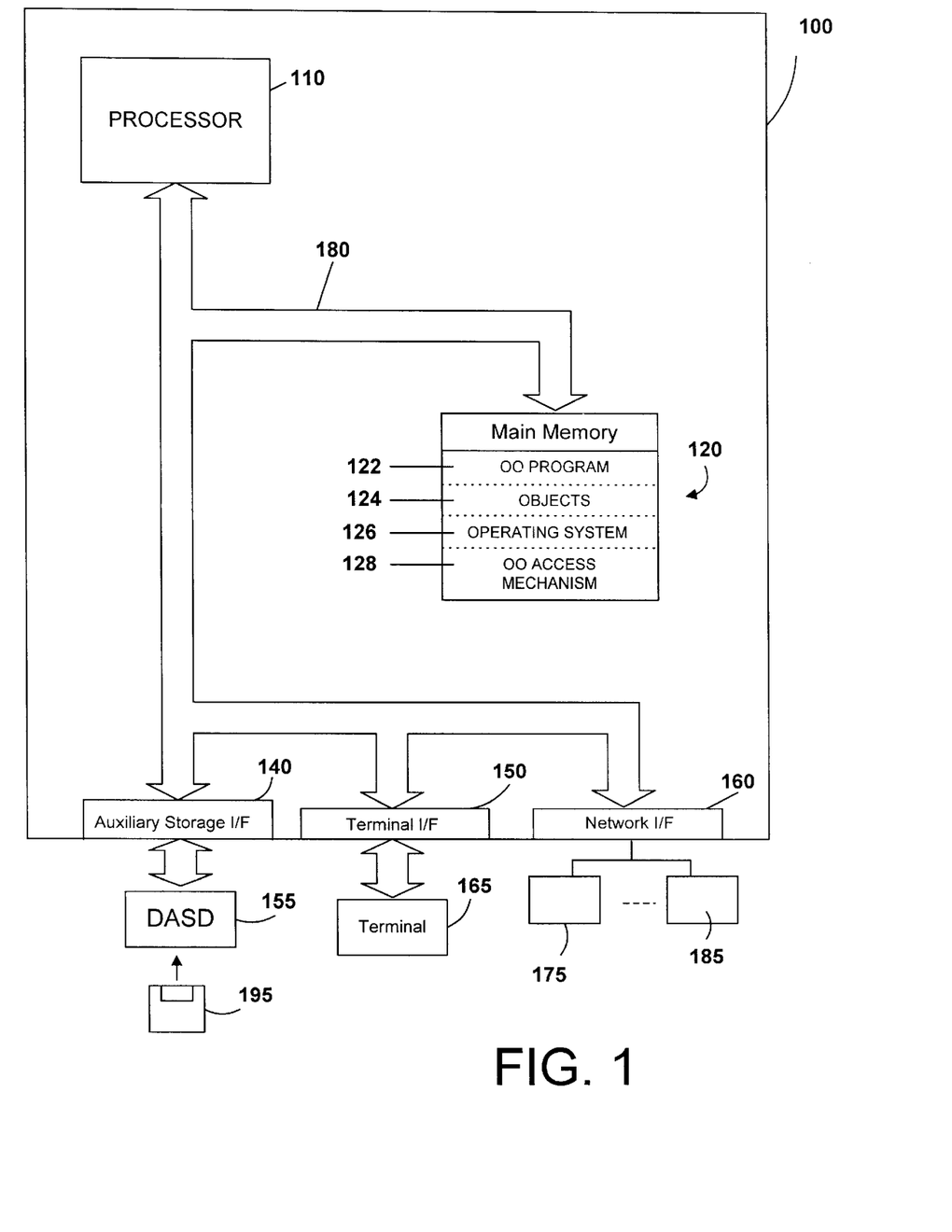
FIG. 1 is a block diagram of an apparatus according to a preferred embodiment of the present invention.

Referring to FIG. 1, a computer system 100 in accordance with a preferred embodiment is an enhanced IBM AS/400 computer system. However, those skilled in the art will appreciate that the mechanisms and apparatus of the present invention apply equally to any computer system, regardless of whether the computer system is a complicated multi-user computing system or a single user device such as a personal computer or workstation. Computer system 100 suitably comprises a processor 110 connected to main memory 120, a memory controller 130, an auxiliary storage interface 140, a terminal interface 150, and network interface 160, all of which are interconnected via a system bus 180. Auxiliary storage interface 140 is used to connect mass storage devices (such as DASD device 155) to computer system 100. One specific type of DASD device is a floppy disk drive, which may store data to and read data from a floppy diskette 195. Note that various modifications, additions, or deletions may be made to the computer system 100 illustrated in FIG. 1 within the scope of the present invention such as the addition of other peripheral devices; FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor.

Main memory 120 contains an OO program 122, objects 124, an operating system 126, and an OO access mechanism 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while program 122, objects 124, operating system 126, and OO access mechanism 128 are shown to reside in main memory 120, those skilled in the art will recognize that these programs are not necessarily all completely contained in main memory 120 at the same time. (It should also be noted that the term "computer system memory" is used herein to generically refer to the entire virtual memory of computer system 100.)

Operating system 126 is a multitasking operating system known in the industry as OS/400; however, those skilled in the art will appreciate that the spirit and scope of the present invention is not limited to any one operating system. Operating system 126 preferably supports an OO programming environment such as that provided, for example, by the C++ programming language.

Although computer system 100 is shown to contain only a single main processor and a single system bus, those skilled in the art will appreciate that the present invention may be practiced using a computer system that has multiple processors and/or multiple buses. In addition, the interfaces (called input/output (I/O) processors in AS/400 terminology) that are used in the preferred embodiment each include separate, fully programmed microprocessors that are used to off-load compute-intensive processing form processor 110. However, those skilled in the art will appreciate that the present invention applies equally to computer systems that simply use I/O adapters to perform similar functions.

Terminal interface 150 is used to directly connect one or more terminals 165 to computer system 100. These terminals 165, which may be non-intelligent or fully programmable workstations, are used to allow system administrators and users to communicate with computer system 100.

Network interface 160 is used to connect other computer systems and/or workstations (e.g., 175 and 185 in FIG. 1) to computer system 100 in networked fashion. The present invention applies equally no matter how computer system 100 may be connected to other computer system and/or workstations regardless of whether the connection(s) is made using present-day analog and/or digital techniques or via some networking mechanism of the future. It is also important to point out that the presence of network interface 160 within computer system 100 means that computer system 100 may engage in cooperative processing with one or more other computer systems or workstations. Of course, this in turn means that the programs shown in main memory 120 need not necessarily all reside on computer system 100. For example, one or more portions of program 122 may reside on another system and engage in cooperative processing with one or more programs that reside on computer system 100. This cooperative processing could be accomplished through use of one of the well known client-server mechanisms such as remote procedure call (RPC).

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 195) and CD ROMS, and transmission type media such as digital and analog communication links.

Figure 2:
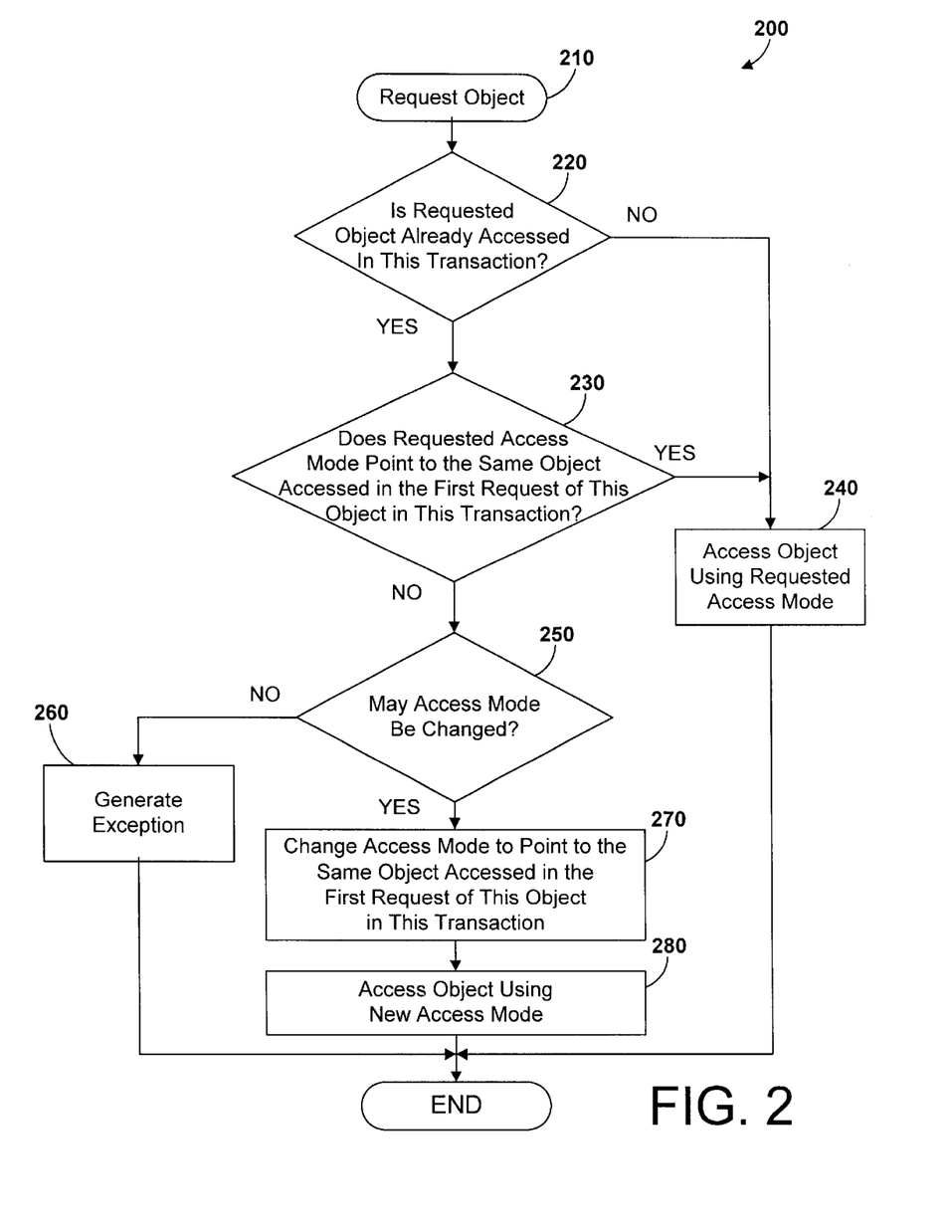
FIG. 2 is a flow diagram of a method in accordance with the present invention.

OO access mechanism 128 of FIG. 1 performs a method 200 of FIG. 2 in the preferred embodiment that manages object accesses within a particular transaction. In the broadest sense, method 200 simply keeps track of the first access to an object in a given transaction, and assures that all subsequent accesses are routed to the same object. Thus, a home access to an object will preclude copying the object for local access in a subsequent request in the same transaction. Likewise, a local access to an object in another process will preclude accessing that object in its home location in the same transaction. In this manner, the present invention assures object transactional integrity, making sure that a change made to a copy is visible to the entire transaction.

A transaction as used herein may be contained within a single process, or may include multiple processes that may be on a single computer system or that may be distributed over a network. Method 200 begins when an object is requested (step 210). First, method 200 determines whether or not the requested object has been accessed during this transaction (step 220). If the object has not been accessed in the current transaction (step 220=NO), the object is accessed using the requested access mode (step 240). If, however, the requested object has been previously accessed in the current transaction (step 220=YES), method 200 determines whether or not the requested access points to the same object that was previously accessed in the first request to the object in the current transaction. If so (step 230=YES), the object is accessed using the requested access mode (step 240). If not (step 230=NO), method 200 will not access the object using the requested access mode. In this case, method 200 must first determine whether the access mode may be changed (step 250). If the access mode cannot be changed for any reason (step 250=NO), an exception is generated (step 260) to indicate that the requested access mode cannot be accommodated. If the access mode can be changed (step 250=YES), the access mode is changed to point to the same object that was accessed during the first request for the object in the current transaction (step 270). The requested object is then accessed by the new access mode (step 280). Method 200 assures that the same actual object is accessed throughout a transaction to avoid the problem with data coherency that results from one process in a transaction changing a local copy of an object while another process in the same transaction changes the object in its home location or the problem of two different processes having separate local copies in the same transaction.

Figure 3:
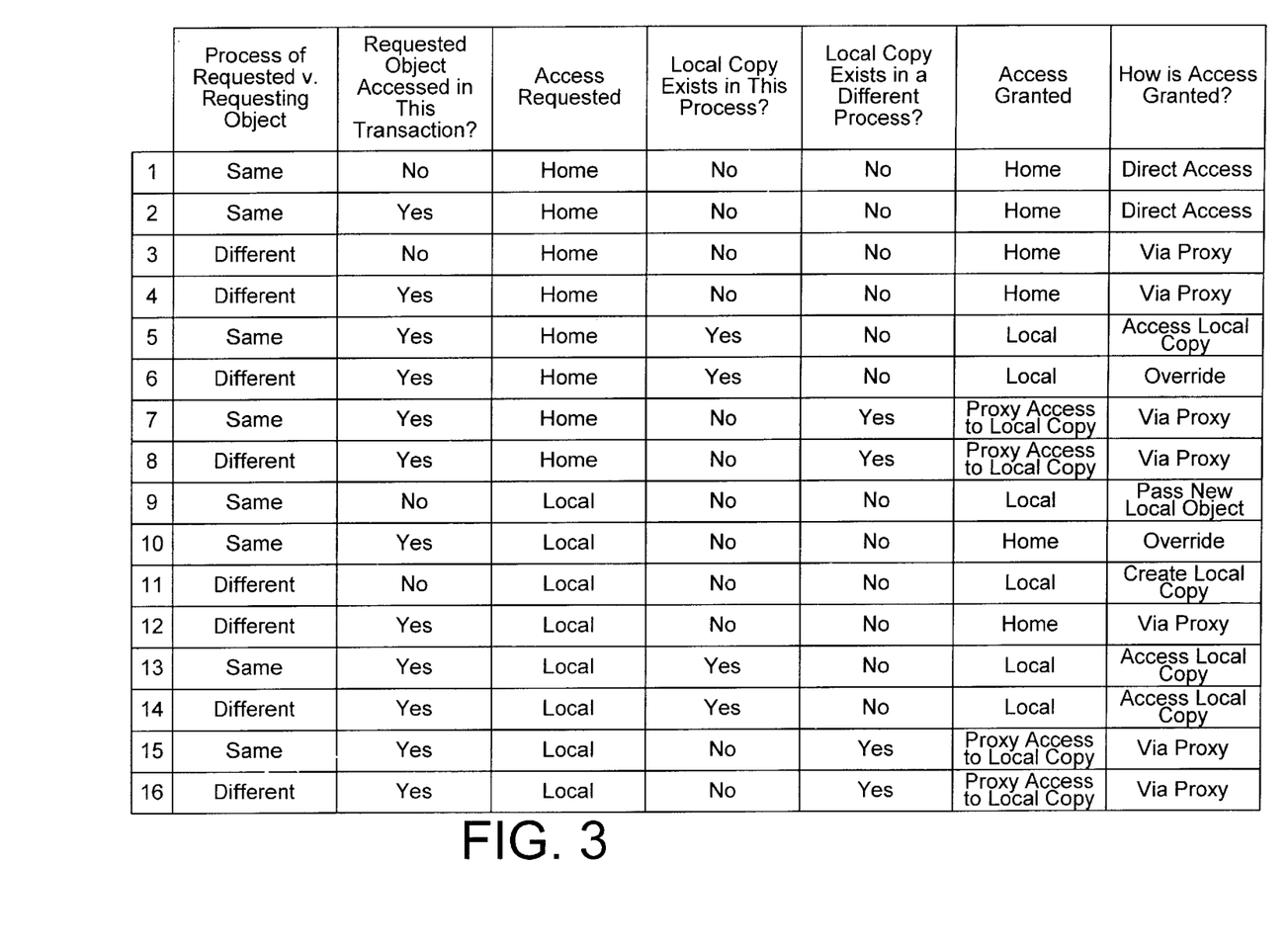
FIG. 3 is a table showing how the method of FIG. 2 handles object accesses in a variety of different circumstances.

The details of method 200 in accordance with the preferred embodiment is shown in table form in FIG. 3. If the requested object has never been accessed in the current transaction (step 220=NO), the object is accessed using the requested access mode (step 240), as shown in lines 1, 3, 9, and 11 of FIG. 3. If the requested object has been previously accessed in the current transaction (step 220=YES), method 200 next determines if the requested access mode points to the same object accessed previously in the first request to this object in this transaction (step 230). The YES case of step 230 is represented in lines 2, 4, 13, and 14 of FIG. 3. The remaining lines in FIG. 3 (i.e., lines 5–8, 10, 12, and 15–16) show the changed access mode that is used in steps 270 and 280 to access the same object that was previously accessed in the current transaction.

Note that in lines 7, 8, 15, and 16, the access granted is "Proxy Access to Local Copy." This access mode is providing proxy access to an existing local copy that resides in a different process, and does not create a new local copy. Similarly, in lines 13 and 14, in the last column, the access to a local copy is an access to an existing local copy, and no new local copy is created.

Figure 4:
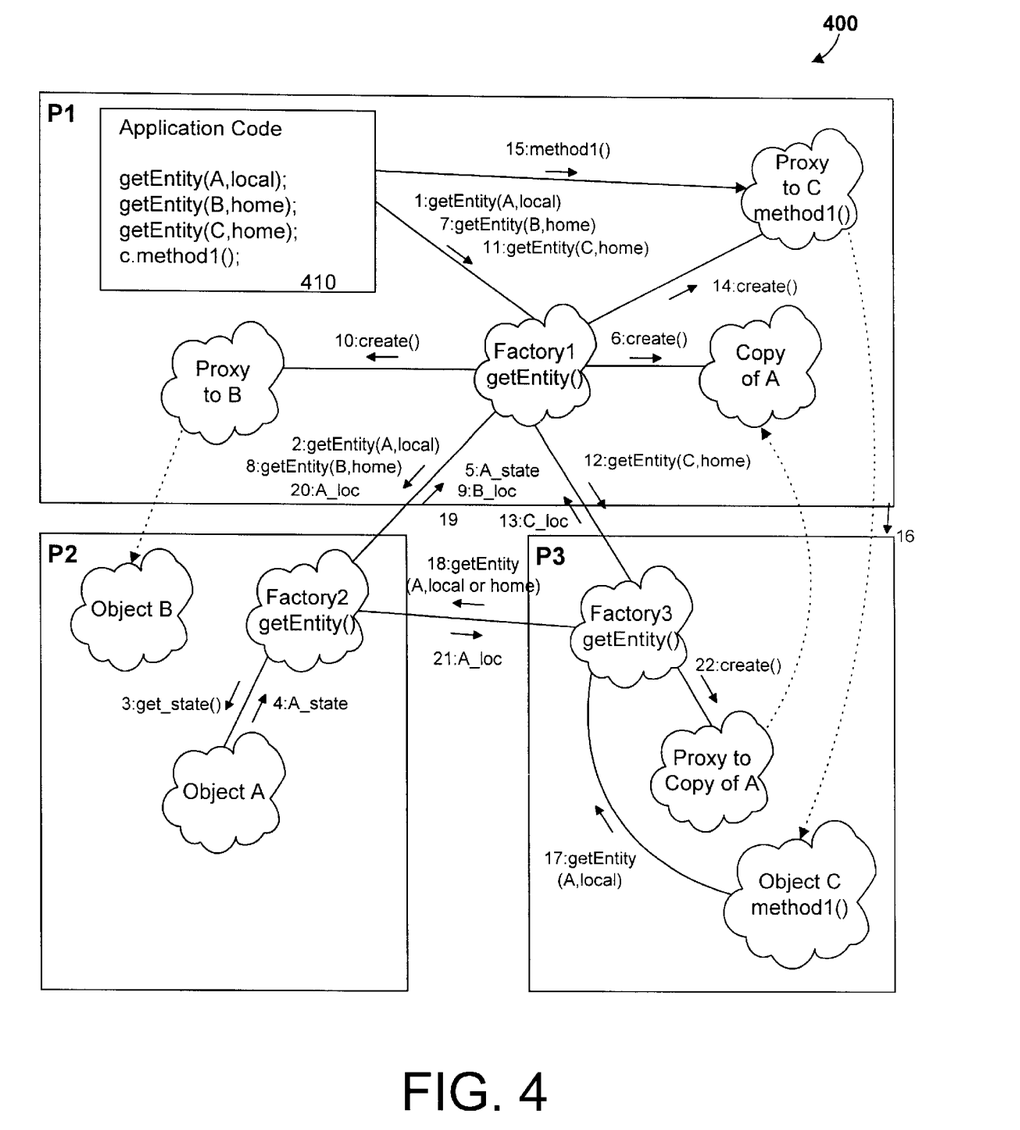
FIG. 4 is an object diagram showing a specific example of the method of the preferred embodiment shown in FIG. 2.

Referring to FIG. 4, one example of a suitable OO implementation 400 of the preferred embodiment includes three processes P1, P2 and P3, which are processes in a distributed object environment. P1 has a portion of application code 410 that is being executed. For the purpose of illustration, it is assumed that the instructions shown in application code 410 in FIG. 4 are all within a single transaction, and that none of objects A, B and C have been previously accessed in this transaction prior to the first instruction shown in application code 410. Each process P1, P2, and P3 has a corresponding factory object Factory1, Factory2, and Factory3, respectively. Each factory object is responsible for providing objects that are needed by their respective processes. These needed objects may exist in other processes, in which case the factory returns the location of the desired object. In the alternative, a needed object may not exist, and the factory object will create the needed object. An object accesses its respective factory object by invoking the getEntity( ) method on the factory. For the preferred embodiment, the requesting client passes the object name and the preferred access mode as parameters to the getEntity( ) method call. One sample sequence of events is shown in FIG. 4 for the purposes of illustrating the invention.

Application code 410 invokes the getEntity( ) method on Factory1, passing (A,local) as parameters, which specifies that local access is preferred (step 1). Factory1 then invokes the getEntity( ) method on Factory2, passing (A,local) as parameters (step 2). In response, Factory2 invokes a method get_state( ) on Object A (step 3), which causes Object A to return its state (A_state) to Factory2 (step 4). Factory2 then returns A_state to Factory1 (step 5). From this state data for object A, Factory1 creates a local copy of object A (step 6).

The next instruction in application code 410 is getEntity (B,home), which invokes the getEentity( ) method on Factory1, specifying Object B and a preferred access mode of home (step 7). In response, Factory1 invokes the getEntity( ) method on Factory2 (step 8). Factory2 then returns the location of Object B (B_loc) to Factory1 (step 9). Factory1 uses the location of Object B to create a Proxy to B (step 10). This proxy has methods identical to the methods on Object B, but invoking these methods causes the Proxy to 13 to invoke the corresponding methods on Object B, as shown by the dotted line between the Proxy to B and Object B.

Next, the instruction getEntity(C,home) in application code 410 is executed, which invokes the getEntity( ) method on Factory1, specifying Object C and a preferred access mode of home (step 11). In response, Factory1 invokes the getEntity( ) method on Factory3 (step 12). Factory3 then returns the location of Object C (C_loc) to Factory1 (step 13). Factory1 uses the location of Object C to create a Proxy to C (step 14). Like the Proxy to B object, the Proxy to C object has methods that invoke the corresponding methods on Object C.

The next instruction in application code 410 is c.method1( ), which specifies that a method called method1( ) on Object C needs to be invoked. This instruction invokes the method1( ) method on the Proxy to C (step 15), which, in turn, invokes the method1( ) method on Object C (step 16). This method includes a reference to Object A, which results in Object C invoking the getEntity( ) method on Factory3, passing (A, local) as parameters, specifying that Object A is needed and that local access is preferred (step 17). Factory3 then invokes getEntity( ) on Factory2 with the same parameters (step 18). Factory2, in turn, invokes the getEntity( ) method on Factory1 with the same parameters (step 19), recognizing that Factory2 previously sent state data for Object A to Factory1 in step 5. Factory 1 returns the location of the Copy of A (A_loc) to Factory2 (step 20), and Factory2 passes this information on to Factory3 (step 21). Now that Factory3 knows the location of the appropriate object to access for Object A (i.e., the Copy of A in P1), Factory3 creates a Proxy to Copy of A object (step 22).

Many of the steps in FIG. 4 correspond to scenarios represented in the table of FIG. 3. For example, the getEntity (A,local) instruction specifies that P1 would like to access Object A locally. When Factory1 determined that Object A was not previously accessed in this transaction and had a home location in another process (steps 2–5), it created a local Copy of A to grant local access. This scenario is illustrated in line 11 of FIG. 3. When Factory1 determined that Object B had not been accessed, it created a Proxy to B in steps 8–10. This scenario is illustrated in line 3. When Factory1 determined that Object C had not yet been accessed, and that home access was preferred, the location of Object C was used to create the Proxy to C. This scenario is illustrated in line 3 of FIG. 3. When method1( ) on Object C invokes getEntity(A,local), Factory 3 determines that Object A has already been accessed during this transaction, and therefore creates a proxy to the existing Copy of A in P1. This corresponds to line 16 in FIG. 3.

In FIG. 3, the term "proxy access to local copy" means that an existing copy exists in another process, and the existing copy is referenced via a proxy. While the details of the preferred embodiment are described in relation to FIGS. 3 and 4, in concept the invention is relatively simple. Once an object has been requested and accessed during a transaction, remember the location of the object that was accessed, and make sure that all subsequent requests are routed to the same location. In this manner data coherency is maintained.

The table of FIG. 3 assumes that the access mode may be changed, if necessary (i.e., that step 250 of FIG. 2 is YES). Note, however, that the access mode may be determined by suitable parameters for the getEntity( ) method. One such parameter could be a compatibility mode parameter that may be set to specify one of the following options: 1) allow changes to the access mode; 2) not allow changes to the access mode; and 3) try to use the same access mode as an associated container object. If changes to the access mode were not allowed in FIG. 3, lines 5–8, 12, 15 and 16 would generate an exception (step 260 of FIG. 2) and not grant the requested access.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, in line 9 of FIG. 3, rather than making a local copy, direct access to the object could be returned. This could improve performance by avoiding the cost of making a copy. This optimization might not occur if the compatibility mode parameter specifies that changes are not allowed. These and other variations of the description herein are within the scope of the invention as claimed.

What is claimed is:

1. An apparatus comprising:
   at least one processor;
   a memory coupled to the at least one processor;
   an object oriented access mechanism that resides in the memory and is executed by the at least one processor and that controls accesses to objects by identifying a first object that is accessed during a first object request at a location determined by a specified access mode for the first object request, and that routes a second object request using a specified access mode to the first object in the same location where the first object was accessed by the first object request if the second object request points to an object different than the first object, and the specified access mode of the second object request can be changed to point to the first object.

2. The apparatus of claim 1 wherein the first and second object requests are in the same transaction.

3. The apparatus of claim 1 wherein the object oriented access mechanism comprises at least one method on at least one factory object that determines the location of an entity specified in a call to the at least one method.

4. The apparatus of claim 3 wherein the at least one method recognizes at least one access control parameter to determine the behavior of the at least one method.

5. The apparatus of claim 4 wherein the at least one access control parameter includes a parameter indicating that the specified access mode may be changed.

6. The apparatus of claim 4 wherein the at least one access control parameter includes a parameter indicating that the specified access mode may not be changed.

7. The apparatus of claim 4 wherein the at least one access control parameter includes a parameter indicating that the access mode is preferably the same as a container for the requested object.

8. The apparatus of claim 1 wherein the object oriented access mechanism generates an exception if the specified access mode of the second object request cannot be changed to point to the first object.

9. A method for accessing a requested object in a distributed object environment, the method comprising the steps of:
   identifying a first object that is accessed during a first object request at a location determined by a specified access mode for the first object request;
   routing a second object request using a specified access mode to the first object in the same location where the first object was accessed by the first object request if the second object request points to an object different than the first object, and the specified access mode of the second object request can be changed to point to the first object; and
   refusing the second object request if the specified access mode of the second object request cannot be changed to point to the first object.

10. The method of claim 9 further comprising the step of:
    generating an exception if the specified access mode of the second object request cannot be changed to point to the first object.

11. The method of claim 9 further comprising the step of:
    if the specified access mode for the second object request does not point to the first object, changing the specified access mode to a new access mode that points to the first object.

12. The method of claim 9 further comprising the step of:
    if the specified access mode for the second object request does not point to the first object and cannot be changed to point to the first object, generating an exception.

13. A program product comprising:
    an object oriented access mechanism that controls accesses to objects by identifying a first object that is accessed during a first object request at a location determined by a specified access mode for the first object request and that routes a second object request using a specified access mode to the first object in the same location where the first object was accessed by the first object request if the second object request points to an object different than the first object, and the specified access mode of the second object request can be changed to point to the first object, and that refuses the second object request if the specified access mode of the second object request cannot be changed to point to the first object; and
    signal bearing media bearing the object oriented access mechanism.

14. The program product of claim 13 wherein the signal bearing media comprises recordable media.

15. The program product of claim 13 wherein the signal bearing media comprises transmission media.

16. The program product of claim 13 wherein the object oriented access mechanism comprises at least one method on at least one factory object that determines the location of an entity specified in a call to the at least one method.

17. The program product of claim 16 wherein the at least one method recognizes at least one access control parameter to determine the behavior of the at least one method.

18. The program product of claim 17 wherein the at least one access control parameter includes a parameter indicating that the specified access mode may be changed.

19. The program product of claim 17 wherein the at least one access control parameter includes a parameter indicating that the specified access mode may not be changed.

20. The program product of claim 17 wherein the at least one access control parameter includes a parameter indicating that the access mode is preferably the same as a container for the requested object.

21. The program product of claim 13 wherein the object oriented access mechanism generates an exception if the specified access mode of the second object request cannot be changed to point to the first object.

22. An apparatus comprising:

at least one processor;

a memory coupled to the at least one processor;

an object oriented access mechanism that resides in the memory and is executed by the at least one processor and that receives a request to access a first object using a requested access mode, the access mechanism determining whether the first object has been previously accessed within a current transaction;

if the first object has not been previously accessed within the current transaction, the access mechanism grants the request to access the first object using the requested access mode;

if the first object has been previously accessed within the current transaction, the access mechanism determines whether the requested access mode would access the first object in the same location as the previous access;

if the requested access mode would access the first object in the same location as the previous access, the access mechanism accesses the first object with the requested access mode;

if the requested access mode would access a second object that is a proxy or local copy of the first object, determining whether the requested access mode may be changed;

if the requested access mode may be changed, the access mechanism accesses the first object using an access mode that assures the first object is accessed; and if the requested access mode may not be changed, generating an exception.

23. A program product comprising:

(A) an object oriented access mechanism that receives a request to access a first object using a requested access mode, the access mechanism determining whether the first object has been previously accessed within a current transaction;

if the first object has not been previously accessed within the current transaction, the access mechanism grants the request to access the first object using the requested access mode;

if the first object has been previously accessed within the current transaction, the access mechanism determines whether the requested access mode would access the first object in the same location as the previous access;

if the requested access mode would access the first object in the same location as the previous access, the access mechanism accesses the first object with the requested access mode;

if the requested access mode would access a second object that is a proxy or local copy of the first object, determining whether the requested access mode may be changed;

if the requested access mode may be changed, the access mechanism accesses the first object using an access mode that assures the first object is accessed; and if the requested access mode may not be changed, generating an exception; and (B) signal bearing media bearing the object oriented access mechanism.

24. The program product of claim 23 wherein the signal bearing media comprises recordable media.

25. The program product of claim 23 wherein the signal bearing media comprises transmission media.

26. A method for accessing a requested object in a distributed object environment, the method comprising the steps of:

identifying a first object that is accessed during a first object request at a location determined by a requested access mode for the first object request;

determining whether the first object has been previously accessed whithin a current transaction;

if the first object has not been previouslty accessed within the current transaction, granting the request to access the first object using the requested access mode;

if the first object has been previously accessed within the current transaction, determining whether the requested access mode would access the first object in the same location as the previous access;

if the requested access mode would access the first object in the same location as the previous access, accessing the first object with the requested access mode;

if the requested access mode would access a second object that is proxy or local copy of the first object, determining whether the requested access mode may be changed;

if the requested access mode may be changed, accessing the first object using an access mode that assures the first object is accessed; and if the requested access mode may not be changed, generating an exception.

* * * * *